(12) United States Patent
Zhou et al.

(10) Patent No.: US 12,551,444 B2
(45) Date of Patent: Feb. 17, 2026

(54) DEVICE AND METHOD FOR FORMING SPHERICAL PARTICLE CLUSTERS WITH ULTRAFINE POWDERS

(71) Applicant: Suzhou Inhal Pharma Co., Ltd., Jiangsu (CN)

(72) Inventors: Hang Zhou, Jiangsu (CN); Yingliang Ma, Jiangsu (CN); Jianhui Liu, Jiangsu (CN); Jingxu Zhu, Jiangsu (CN); Kaiqi Shi, Jiangsu (CN)

(73) Assignee: Suzhou Inhal Pharma Co., Ltd., Suzhou (CN)

( * ) Notice: Subject to any disclaimer, the term of this patent is extended or adjusted under 35 U.S.C. 154(b) by 202 days.

(21) Appl. No.: 18/201,116

(22) Filed: May 23, 2023

(65) Prior Publication Data
US 2024/0115505 A1    Apr. 11, 2024

(30) Foreign Application Priority Data

May 23, 2022    (CN) .......................... 202210565160.5

(51) Int. Cl.
*A61K 9/00*    (2006.01)
*A61K 9/16*    (2006.01)

(52) U.S. Cl.
CPC .......... *A61K 9/1694* (2013.01); *A61K 9/1617* (2013.01); *A61K 9/1623* (2013.01)

(58) Field of Classification Search
CPC ........................... A61K 9/1694; A61K 9/1617
See application file for complete search history.

(56) References Cited

U.S. PATENT DOCUMENTS 6,371,171 B1 *    4/2002    Trofast ...................... B01J 2/20
                                                                  141/1

* cited by examiner

*Primary Examiner* — Nicholas Krasnow

(57) ABSTRACT

A device suitable for forming spherical particle clusters from fine powder is a device through which spherical particle clusters having a controlled particle size and a controlled hardness can be prepared from the fine powder by using a rolling granulation principle without adding any solution or solid binder. In particular, the device includes the following components: a) a preforming device for preforming particle clusters formed from fine powder, so that the particle clusters have a certain strength and shape while conveying the particle clusters to a next step at a certain speed; b) a spheroidizing device for further strengthening the particle clusters formed by a) the preforming device, so that the particle clusters have a higher sphericity and hardness; and c) a grading device for sieving the particle clusters spheroidized by b) the spheroidizing device to obtain particle clusters of different particle size ranges.

4 Claims, 4 Drawing Sheets

DEVICE AND METHOD FOR FORMING SPHERICAL PARTICLE CLUSTERS WITH ULTRAFINE POWDERS

CROSS-REFERENCE TO RELATED APPLICATION

This application claims priority from the Chinese patent application 202210565160.5 filed Mar. 23, 2022, the content of which are incorporated herein in the entirety by reference.

TECHNICAL FIELD

The present disclosure belongs to the technical field of pharmaceutical devices, and in particular relates to a device suitable for forming spherical particle clusters from fine powder, and a use method thereof.

BACKGROUND

Fine particles often exhibit poor flowability, and have high surface free energy, particularly particles having a particle size of less than 20 μm. Due to the influence of the van der Waals force between the particles, these particles are usually easy to agglomerate together, and these agglomerates have a low bulk density and have poor flowability, which is often not conducive to transporting and metering. In certain fields, such as inhalation preparations, it is often desirable for powder to have a small particle size but good flowability and dispersibility. Therefore, it is often necessary to add a large amount of a dispersing agent such as lactose, or to add a third component such as mannitol, phospholipid, leucine, magnesium stearate, polyethylene glycol 6000 and the like into formulae of these inhalation preparations to improve the flowability.

However, this often only improves the flowability to a certain extent, and this often also limits the amount of active substances that can be added to a great extent. Preparing powder into particles is an effective method to improve flowability, and adding a solution to the powder for granulation or pressing the powder into particles by using pressure is currently a common method. However, these methods tend to make the powder irreversibly become larger particles, which cannot be broken into fine particles by an airflow and are therefore not suitable for the field of inhalation.

When the fine particles are shaken, it can be found that the fine particles agglomerate with each other into clusters of particles, and these clusters of particles may be irregular, but tend to form spherical shapes. In general, the flowability of these clusters of particles is significantly better than that in a powder state, but these clusters of particles have very low strength, and are easy to break and disperse. By using the phenomenon that the fine particles agglomerate with each other into clusters of particles by shaking or vibrating, the fine powder can be prepared into clusters of particles by applying a certain form of shaking or vibrating to fine powder, and by adjusting the time and intensity of the shaking or vibrating, spherical clusters of particles with a controlled roundness, intensity and particle size can be obtained.

Meanwhile, the applications in the prior art are as follows: Tomoaki Hino (Int J Pharm, 168: 59-68 (1998)), et al. prepared Wogon extract granules having good flowability from Wogon extract powder by impacting, rolling, stirring and the like. According to the results of the experiment, a rolling granulation method provides the maximum effective index and improves the inhalation performance of the original Wogon extract powder. The effective index of granules prepared by rolling granulation and impact granulation at a lower compaction pressure is greater than that of commercially available disodium cromoglycate inhalation powder Intal®.

As another example, previous studies are as follows: Masayuki Watanabe, et al. (Aaps Pharmscitech, 4 (4), 506-513 (2003)) used a fluidized bed to fluidize and compact sodium salicylate powder by cyclically alternating upward and downward airflows to prepare sodium salicylate spherical particles without a binder, and the amount of fine particles can reach 40% at a flow rate of 28.3 L/min.

Kazuhiko Ikegami et al (Journal of Controlled Release Volume 88, Issue 1, 23-33 (2003)) prepared agglomerates of KSR-592 β-type acicular crystals by using a liquid spherical agglomeration method, and the particle size and mechanical strength of the agglomerates are controlled by changing the stirring speed of an agglomeration system. The prepared agglomerates exhibit ideal flowability, and are effectively decomposed into fine inhalable particles in a grinding chamber of a device (Jethaler).

WO9509615 describes a method in which micronized drugs are extruded by a screw extruder to form agglomerates, and these agglomerates are spheroidized to obtain free flowing and crushable pellets.

U.S. Pat. No. 5,143,126A describes a device which vibrates a poorly flowing powder through a helical mechanical vibrator to form flowable agglomerates of particles which can be further transported and quantified.

SUMMARY

1. Problems to be Solved

For the above-mentioned problems existing in the prior art, the present disclosure provides a device suitable for forming spherical particle clusters from fine powder and a use method thereof, and the device is a device through which spherical particle clusters having a controlled particle size and a controlled hardness can be prepared from the fine powder by using a rolling granulation principle without adding any solution or solid binder. Exemplarily, the device includes the following components: a) a preforming device for preforming particle clusters formed from fine powder, so that the particle clusters have a certain strength and shape while conveying the particle clusters to a next device at a certain speed; b) a spheroidizing device for further strengthening the particle clusters formed by a) the preforming device, so that the particle clusters have a higher sphericity and hardness; and c) a grading device for sieving the particle clusters spheroidized by b) the spheroidizing device to obtain particle clusters of different particle size ranges.

2. Technical Solution

To solve the above problems, the present disclosure adopts the technical solutions as follows.

A device suitable for forming spherical particle clusters from fine powder includes a preforming device, a spheroidizing device and a grading device, wherein

- the preforming device includes one or more screens and a vibration groove, wherein the vibration groove is disposed under the screens;
- the spheroidizing device includes a rotating metal cylindrical container or the spheroidizing device is implemented as a rotating metal cylindrical container, wherein the bottom of the metal cylindrical container is provided with one or more baffles for promoting the flow of clusters within the cylindrical container; an inner wall of the metal cylindrical container is coated with one or more coatings including, but not limited to, one or a combination of more of Teflon, polyurethane, polyurethane resin, epoxy resin, hydroxypolyester resin, and epoxy/polyester resin; and the metal cylindrical container is fixed on a rotating shaft which is rotatable and has an adjustable rotation speed and angle; and the grading device includes one or more vibrating screens, and even the grading device itself consists of one or more vibrating screens for grading the prepared spherical particle clusters according to particle sizes.

It should be noted that rotating metal cylindrical container is used to spheroidize the powder and form particles.

Typically, an initial raw material is fed into the device by a feeding device for treatment; wherein the feeding device may be a screw feeder, a vibration feeder or other forms of feeders, preferably the screw feeder, more preferably a twin screw feeder; and the feeder performs feeding through a hopper provided with a rotating stirring knife inside for forcing a poorly flowing material to flow, avoiding powder bridging.

In the device suitable for forming the spherical particle clusters from the fine powder, the screens have a pore size of 100-2000 μm;

one or more rotating scrapers with adjustable directions and speeds are arranged on the screens, and the scrapers are used for forcing fine powder clusters that do not pass through the screens to pass through the screens; and the vibration groove is a U-shaped groove, a V-shaped groove or any other shaped groove structure.

In the device suitable for forming the spherical particle clusters from the fine powder, the vibration groove is a U-shaped groove.

In the device suitable for forming the spherical particle clusters from the fine powder, one or more vibration units having an adjustable vibration frequency and intensity are arranged under the vibration groove, and the vibration units are used for vibrating the vibration groove and making fluffy clusters passing through the screens to have a certain hardness and preliminarily shaped.

In the device suitable for forming the spherical particle clusters from the fine powder, an angle between the vibration groove and a horizontal plane is 0-30°.

In the device suitable for forming the spherical particle clusters from the fine powder, a lifting lever is disposed between the vibration groove and the horizontal plane.

The present disclosure further discloses a method of a device suitable for forming spherical particle clusters from fine powder, including the following steps of:

a) preparing fine powder having a particle size in micron level into fluffy clusters;

b) vibrating the fluffy clusters obtained in the step a) to increase their hardness and make the fluffy clusters preliminarily shaped;

c) spheroidizing the preliminarily shaped clusters with an increased hardness obtained in the step b) to prepare spherical particle clusters with a higher roundness and a greater hardness; and d) grading the spherical particle clusters obtained in the step c) to remove fine powder and spherical particle clusters with an excessive particle size.

The prepared spherical particle clusters have good flowability, are easy to transport and quantify, and can be redispersed into fine powder under the action of an airflow.

In the method of the device suitable for forming the spherical particle clusters from the fine powder, the particle size of the fine powder in the step a) is less than 20 μm; preferably less than 10 μm, more preferably less than 5 μm.

In the step a), the fluffy clusters are prepared by scraping the fine powder to pass through screens by scrapers, wherein the screens have a pore size of 100-2000 μm, preferably 200-1000 μm.

A device for vibrating in the step b) is a vibration groove, wherein a vibration frequency of the vibration groove is 10-300 HZ, wherein an angle between the vibration groove and a horizontal plane is 0-30°.

Typically, the vibration groove can select a U-shaped groove.

In the method of the device suitable for forming the spherical particle clusters from the fine powder, a device for spheroidizing in the step c) is a rotatable metal cylindrical container, wherein a rotation speed of the metal cylindrical container is 5-90 RPM, preferably 20-60 RPM, wherein an angle between a bottom surface of the metal cylindrical container and the horizontal plane is 0-80°, preferably 20-50°.

In the method of the device suitable for forming the spherical particle clusters from the fine powder, in the step d), the prepared spherical particle clusters are graded by using one or more screens of different pore sizes; and the spherical particle clusters prepared in the step d) have a hardness of less than 50 mN.

3. Beneficial Effects

Compared with the prior art, the beneficial effects of the present disclosure are as follows:

the present disclosure provides the device suitable for forming the spherical particle clusters from the fine powder, which is a device through which spherical particle clusters having a controlled particle size and a controlled hardness can be prepared from the fine powder by using the rolling granulation principle without adding any solution or solid binder. The present disclosure also provides a method for forming spherical particle clusters from fine powder, and the prepared spherical particle clusters are good in flowability, are easy to transport and quantify, and can be redispersed into fine powder under the action of an airflow, and the method includes the steps of: a) preparing fine powder having a particle size of less than 20 μm into fluffy clusters; b) vibrating the fluffy clusters to increase their hardness and make the fluffy clusters preliminarily shaped; c) spheroidizing the preliminarily shaped clusters with an increased hardness to prepare spherical particle clusters with a higher roundness and a greater hardness; and d) grading the spherical particle clusters to remove fine powder and spherical particle clusters with an excessive particle size.

1—first screen; 2—scraper; 3—hopper; 4—U-shaped groove; 5—vibration unit; 6—vibration controller; 7—base; 8—rotating metal cylindrical container; 9—baffle; 10—rotating shaft; 11—motor; 12—controller; 13—second screen; 14—collection tray; 15—shaker; and 16—controller.

DETAILED DESCRIPTION OF THE EMBODIMENTS

The present disclosure is further described below with reference to specific examples.

The terms "include" and "comprise" as used herein should be understood as being inclusive and open-ended, and not exclusive. Specifically, when used in the description and claims, the terms "include" and "comprise" and their synonyms mean that the specified features, steps or components are included. These terms cannot be understood to exclude the presence of other features, steps or components.

The terms "about" and "approximately" as used herein are intended to encompass changes in values such as attributes, parameters, and dimensions within their upper and lower limits.

The term "cluster" refers to an aggregate of fine particles.

The term "bulk density" refers to a mass per unit volume measured immediately after free filling of powder or particles in a certain container.

The term "roundness" is used to evaluate whether particles are close to be circular, the closer the value is to 1, the higher the roundness, and a roundness calculation formula is as follows:

$$\text{Roundness} = 4 \times \frac{\text{Area}}{\pi \times \text{Spindle length}^2},$$

wherein Area is an area of a projection of particles in an instrument, and Spindle length is a length of a major axis of the projection.

The term "particle size distribution" refers to the percentage of particles of different particle sizes in the total number of particles in a powder sample reflected by using particular instruments and methods.

The term "D90" means the corresponding particle size when the cumulative particle size distribution of a sample reaches 90%, and its physical meaning is that 90% of the particles have a particle size of smaller (or larger) than D90.

The term "high shear mixer" refers to an agitator with paddles and blades that can rotate at a high speed.

Figure 1:
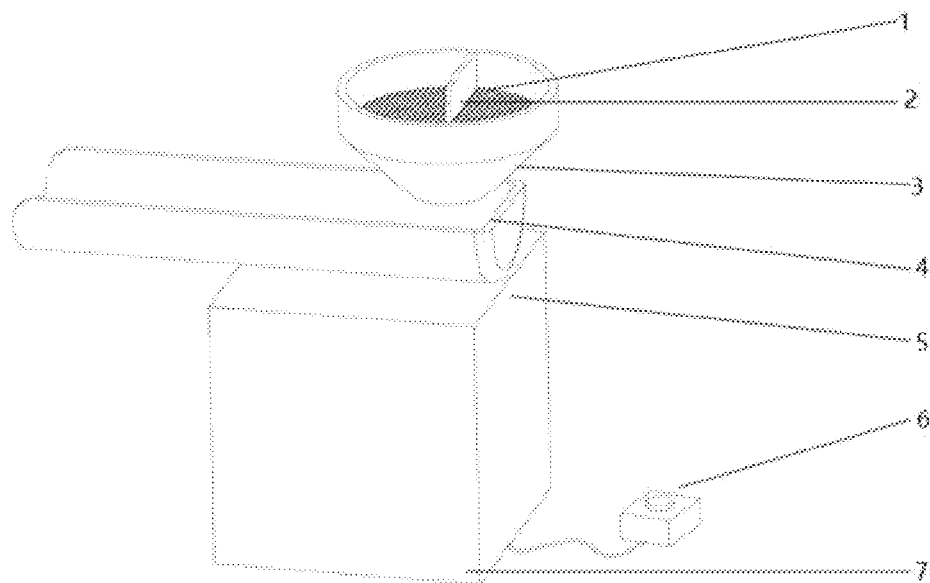
FIG. 1 is a partial device diagram of a first embodiment of the present disclosure.
Figure 2:
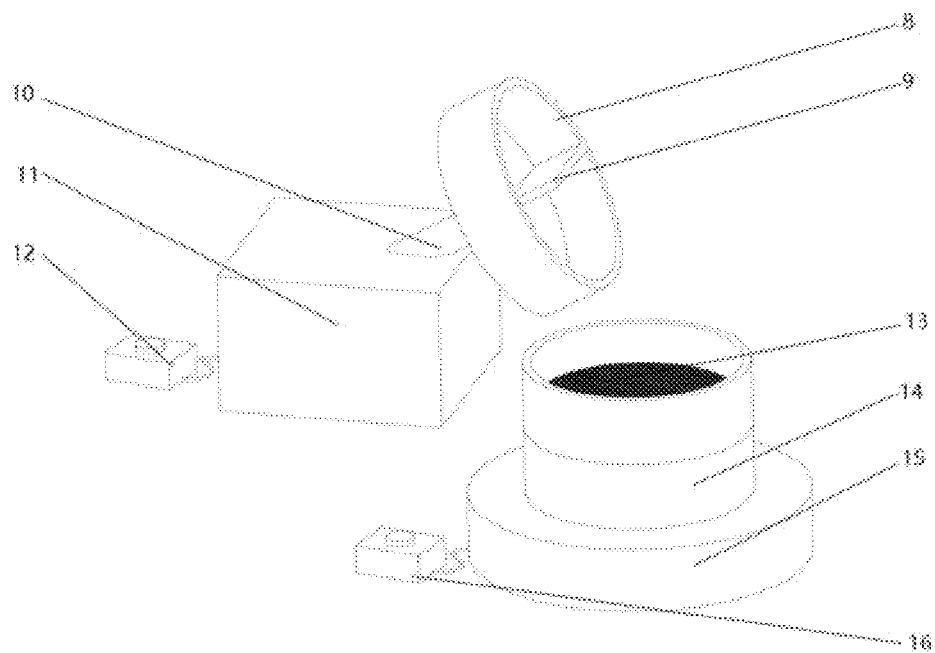
FIG. 2 is a partial device diagram of a second embodiment of the present disclosure.

It should be noted that, the device for forming the spherical particle clusters from the fine powder of the present disclosure is as shown in FIGS. 1 and 2. The device includes: a) a preforming device, b) a spheroidizing device, and c) a grading device.

a) The preforming device includes a first screen 1 of a specific pore size, one or more rotating scrapers 2 are arranged on the first screen 1, a hopper 3 is connected to a position under the first screen 1, and a U-shaped vibration groove 4 is connected to a vibration unit 5 which is controlled to vibrate by a vibration controller 6. Fine powder tends to agglomerate into clusters much larger than single particles due to their large acting force between particles, and when the clusters fall onto the first screen 1 through a feeder, the rotating scrapers 2 press the clusters to pass through the screen, thus obtaining clusters of a certain size, wherein the size of the clusters is mainly determined by a pore size of the first screen 1, and the pore size of the first screen 1 is 100-2000 µm, preferably 200-1000 µm, more preferably 300-600 µm. At this time, the clusters are also irregular and very fluffy, and further treatment is required to improve their roundness and strength. The clusters passing through the first screen 1 fall onto the U-shaped vibration groove 4 in a concentrated manner through the hopper 3. The vibration groove 4 is made of metal. The vibration controller 6 controls the vibration unit 5 to drive the U-shaped vibration groove 4 to vibrate. The vibration unit 5 includes, but is not limited to, one or more of ultrasonic vibration, percussive vibration, and acoustical vibration. In this embodiment, an ultrasonic vibrator is selected. The U-shaped vibration groove 4 continuously beats the clusters, making the originally fluffy clusters more compact, and making the clusters move forward continuously. A base 7 is adjustable in angle, and by adjusting the angle of the base 7, the inclination angle of the U-shaped vibration groove 4 can be changed, wherein the angle is 0-30°, preferably 0-15°.

The clusters passing through a) the preforming device are more compact and have better flowability, and the clusters enter b) the spheroidizing device for further spheroidizing to obtain a desired roundness and hardness. b) The spheroidizing device includes a rotating metal disk 8, the rotating metal disk 8 is provided with a plurality of baffles 9, the rotating metal disk 8 is fixed on a rotating shaft 10, a motor 11 controls the rotating shaft 10 to rotate and drives the rotating metal disk 8 to rotate, and a spheroidizing device controller 12 can control a rotation speed and an elevation angle of the rotating shaft 10.

The preformed clusters fall into the rotating metal spheroidizing disk 8, the clusters are continuously rolled in the rotating metal disk 8, and the baffles 9 allow the clusters to roll more vigorously, which promotes faster formation of the clusters and increases the hardness of the clusters. By adjusting the rotation speed and the elevation angle of the rotating shaft 10, different rolling states can be obtained. The faster the rotation speed and the greater the elevation angle, the more vigorous the rolling of the clusters. However, too fast a rotation speed will cause the clusters to be subjected to a large centrifugal force, causing the clusters to stay at the edge of the wall of the rotating metal disk. The rotation speed is controlled to be 5-90 RPM/min, preferably 20-60

RPM/min in the present disclosure. Too small an elevation angle will cause the clusters to not roll, while too large an elevation angle will cause the clusters to accumulate all the way on the bottom of the rotating metal disk 8. Both the too small elevation angle and the too large elevation angle do not contribute to the rolling of the clusters. The angle between the rotating metal disk 8 and a horizontal plane is 0-80°, preferably 10-60°, more preferably 30-50° in the present disclosure. As the rolling time increases, the shapes of the clusters become more and more spherical, and their hardness gradually increases, and the rolling time is 1-60 min, preferably 5-45 min, more preferably 10-30 min.

By spheroidizing in b) the spheroidizing device, the clusters have good flowability and a certain hardness, but the particle clusters are usually of different sizes, and c) the grading device can grade the particle clusters according to different particle sizes to obtain spherical particle clusters of different sizes. c) The grading device includes one or more second screens 13, which are stacked with each other according to pore sizes, the larger the pore size of a screen, the higher the position where the screen is located, and a collection tray 14 for collecting finest particles is located at the lowermost part. The second screens 13 and the collection tray 14 are stacked with each other and fixed to a shaker 15, and the shaking amplitude and time are controlled by a controller 16. Particle clusters spheroidized by b) the spheroidizing device fall to the uppermost screen, and by rocking vibration, the particle clusters fall gradually until the particle clusters cannot pass through the screen, the particle clusters of different particle sizes are trapped on the screens of different pore sizes, respectively.

Compared with the first embodiment, this embodiment makes a change to the shape of the vibration groove, a) the preforming device includes a first screen 1 of a specific pore size, one or more rotating scrapers 2 are arranged on the first screen 1, a hopper 3 is connected to a position under the first screen 1, and a V-shaped vibration groove is connected to a vibration unit 5 which is controlled to vibrate by a vibration controller 6. By adjusting the angle of a base 7, the inclination angle of the V-shaped vibration groove can be changed, wherein the angle is 0-30°, preferably 0-15°. When the clusters fall onto the first screen 1 through a feeder, rotating scrapers 2 press the clusters to pass through the screen, and the clusters fall onto the V-shaped vibration groove in a concentrated manner through a hopper 3. The high-frequency vibration of the V-shaped vibration groove constantly beats the clusters to make the originally fluffy clusters more compact. At this time, particles clusters having a certain strength and shape are obtained.

After being preformed by a) the preforming device, the particle clusters were treated by b) the spheroidizing device and c) the grading device as in the first embodiment of the present disclosure.

Example 1

Referring to FIG. 1, lactose was used as an experimental material, lactose having a D90 of about 10 μm, and lactose powder was treated by the device of the present disclosure, with a spheroidizing time of 10 min, and its morphology and roundness changes in various stages were measured, as shown in Table 1.

TABLE 1

| Changes of roundness and bulk density in various stages | |
| --- | --- |
| Stage | Roundness |
| Raw material | / |
| After feeding | / |
| After passing through a screen | 0.44 ± 0.19 |
| Preforming device | 0.65 ± 0.11 |
| Spheroidizing device | 0.90 ± 0.03 |

Figure 3:
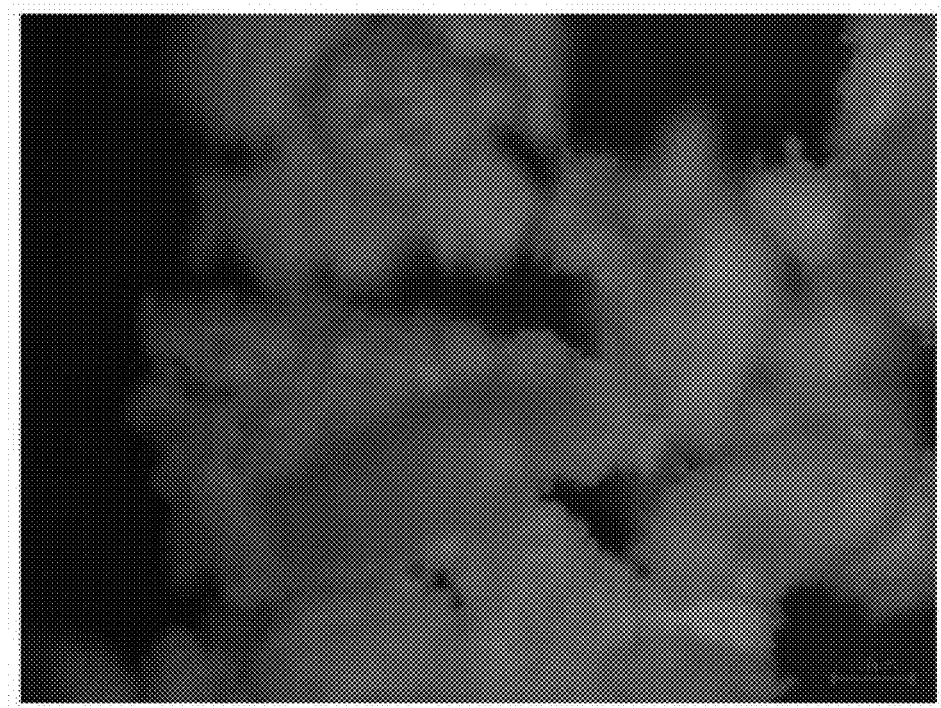
FIG. 3 is a first graph of the change in morphology of spherical particle clusters formed from fine powder in different stages according to the present disclosure.
Figure 4:
FIG. 4 is a second graph of the change in morphology of spherical particle clusters formed from fine powder in different stages according to the present disclosure.
Figure 5:
FIG. 5 is a third graph of the change in morphology of spherical particle clusters formed from fine powder in different stages according to the present disclosure.
Figure 6:
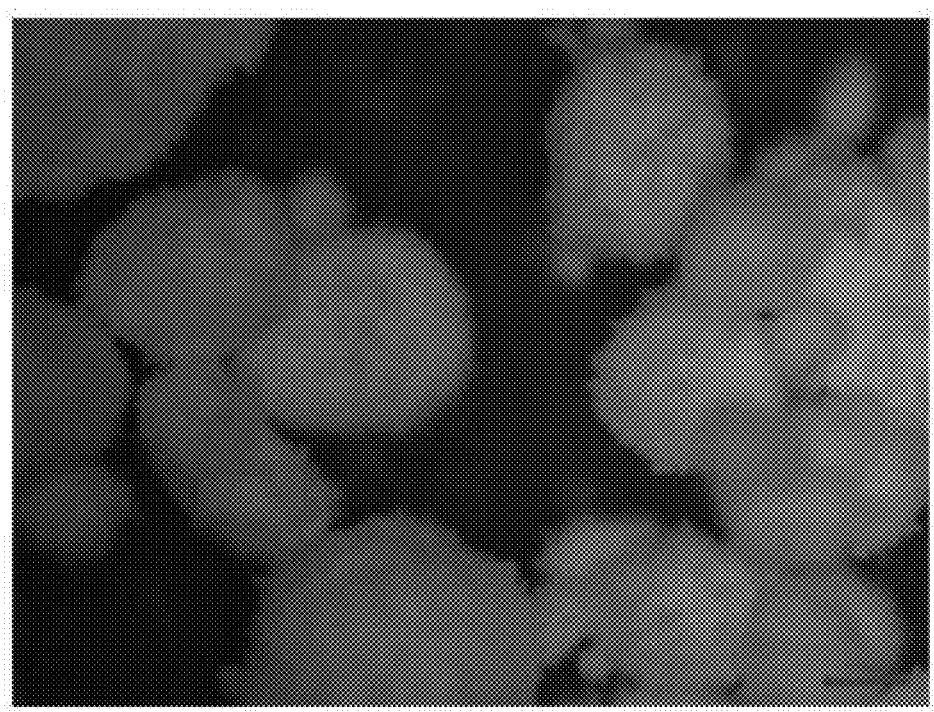
FIG. 6 is a fourth graph of the change in morphology of spherical particle clusters formed from fine powder in different stages according to the present disclosure.
Figure 7:
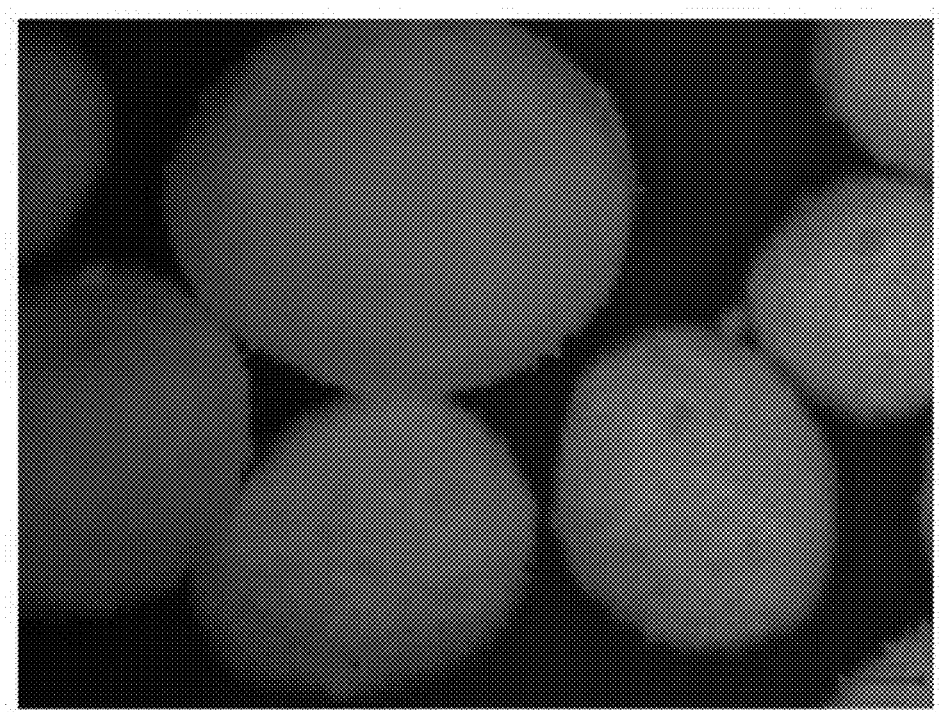
FIG. 7 is a fifth graph of the change in morphology of spherical particle clusters formed from fine powder in different stages according to the present disclosure.

In the raw material stage and the feeding stage, a material exhibited fluffy and irregular clusters (as shown in FIGS. 3 and 4), after passing through a sieving device, the material began to exhibit a granular form, but at this time, the clusters were still relatively fluffy and not very regular in shape (FIG. 5), after passing through a preforming device, the clusters became smoother in appearance and gradually approached spherical in shape (FIG. 6), and after being further spheroidized by a spheroidizing device, the clusters appeared spherical in shape and smooth in appearance (FIG. 7).

Example 2

Referring to FIG. 2, lactose having a D90 of about 10 μm and arginine having a D90 of less than 5 μm were used as experimental materials, the two were mixed in a mass ratio of 4:1 (lactose:arginine) by using a high shear mixer, and then mixed powder was treated by the device of the present disclosure, with a spheroidizing time of 10 min, and its content, hardness, roundness, bulk density and yield were measured, as shown in Table 2.

TABLE 2

| Properties of drug-containing formula spheroidized clusters | | | | | |
| --- | --- | --- | --- | --- | --- |
| Content before granulation % | Hardness mN | Roundness | Bulk density g/ml | Yield % | Content after spheroidizing % |
| 20.21 | 1.33 ± 0.08 | 0.90 ± 0.03 | 0.32 ± 0.04 | 89.3 | 19.96 |

Experimental results showed that the arginine content in the formula was only slightly reduced before and after spheroidizing by the device of the present disclosure.

Example 3

To verify the effect of the spheroidizing time on the final spheroidized clusters, lactose with a D90 of about 10 μm was used as an experimental material, and lactose powder was treated by the device of the present disclosure, wherein the spheroidizing time of a spheroidizing device was set to be 0 min, 5 min, 10 min, 20 min, and 30 min, respectively, and the hardness and roundness of the final spheroidized clusters were measured, as shown in Table 3.

TABLE 3

Effect of the spheroidizing time on roundness and hardness

| Spheroidizing time/min | Roundness | Hardness mN |
|---|---|---|
| 0 | 0.55 ± 0.13 | 0.31 ± 0.11 |
| 5 | 0.83 ± 0.09 | 0.86 ± 0.08 |
| 10 | 0.88 ± 0.05 | 1.42 ± 0.09 |
| 20 | 0.93 ± 0.02 | 2.11 ± 0.10 |
| 30 | 0.95 ± 0.03 | 3.01 ± 0.08 |

Increasing the spheroidizing time can significantly improve the hardness and roundness of the final spheroidized clusters.

Example 4

In order to verify the necessity of a preforming device, the properties of spheroidized clusters produced by spheroidizing of a material after passing through the preforming device were compared with those of spheroidized clusters produced by granulating without the preforming device. A test used lactose with a D90 of about 10 μm as an experimental material, a screen of 300 μm was used, a spheroidizing time was controlled to be 10 min, spheroidized clusters were graded by using a combination of screens of 100 μm, 200 μm, 300 μm, 400 μm, 500 μm, and 600 μm after the end of spheroidizing, and the proportion of particles at all levels was calculated, as shown in Table 4.

TABLE 4

Difference in cluster performance with a preforming device and without a preforming device

| | Particle size distribution % | | | | | | | | |
|---|---|---|---|---|---|---|---|---|---|
| | <100 μm | 100-200 μm | 200-300 μm | 300-400 μm | 400-500 μm | 500-600 μm | >600 μm | Roundness | Bulk density g/ml |
| With preforming device | 3.4 | 17.2 | 22.1 | 33.7 | 18.6 | 4.7 | 0.3 | 0.91 ± 0.03 | 0.34 ± 0.03 |
| Without preforming device | 1.3 | 8.8 | 14.7 | 19.8 | 28.6 | 14.3 | 12.5 | 0.80 ± 0.04 | 0.31 ± 0.05 |

Figure 8:
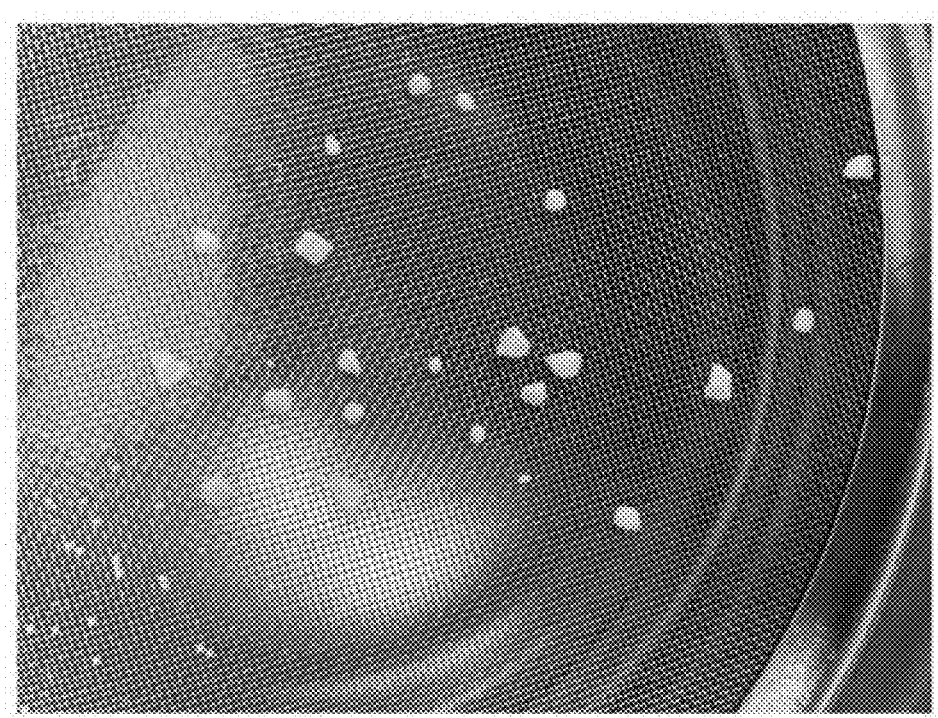
FIG. 8 is a diagram of large particle clusters prepared without a preforming device according to the present disclosure.

Compared with clusters spheroidized after passing through the preforming device, clusters produced without the preforming device have a significantly larger particle size, the proportion of large clusters is high, and the sphericity of the large clusters is low (as shown in FIG. 8). This is due to the fact that clusters that are not preformed by the preforming device are relatively fluffy and irregular. If the clusters are spheroidized directly in a spheroidizing disk of a spheroidizing device, the fluffy clusters will squeeze against each other and adhere with each other to form larger clusters. These large clusters, due to their larger mass, continue to squeeze and adhere smaller clusters during spheroidizing.

Example 5

Lactose with a D90 of about 10 μm was spheroidized by using the device of the present disclosure, screens of 100 μm, 300 μm and 500 μm were used respectively, the spheroidizing time of a spheroidizing device was set to be 10 min, and spherical clusters were graded by using a combination of screens of 100 μm, 200 μm, 300 μm, 400 μm, 500 μm, and 600 μm after the end of spheroidizing, and the proportion of particles at all levels was calculated, as shown in Table 5.

TABLE 5

Effect of the pore size of screens on particle size distribution of spheroidized clusters

| Pore size of screens μm | Particle size distribution % | | | | | | |
|---|---|---|---|---|---|---|---|
| | <100 μm | 100-200 μm | 200-300 μm | 300-400 μm | 400-500 μm | 500-600 μm | >600 μm |
| 100 μm | 6.7 | 25.3 | 31.1 | 22.6 | 13.4 | 0.9 | 0 |
| 300 μm | 2.8 | 18.3 | 21.4 | 37.3 | 17.1 | 2.2 | 0.9 |
| 500 μm | 1.3 | 5.2 | 13.7 | 15.9 | 32.9 | 20.4 | 10.6 |

The pore size of the screens has a significant effect on the particle size distribution of the spheroidized clusters, the larger the pore size, the larger the particle size of the resulting clusters.

To sum up, the present disclosure provides the device suitable for forming the spherical particle clusters from the fine powder, through which spherical particle clusters having a controlled particle size and a controlled hardness can be prepared from the fine powder by using the rolling granulation principle without adding any solution or solid binder. The present disclosure also provides a method for forming spherical particle clusters from fine powder, and the prepared spherical particle clusters are good in flowability, are easy to transport and quantify, and can be redispersed into fine powder under the action of an airflow, and the method includes the steps of: a) preparing fine powder having a particle size of less than 20 μm into fluffy clusters; b) vibrating the fluffy clusters to increase their hardness and make the fluffy clusters preliminarily shaped; c) spheroidizing the preliminarily shaped clusters with an increased hardness to prepare spherical particle clusters with a higher roundness and a greater hardness; and d) grading the spherical particle clusters to remove fine powder and spherical particle clusters with an excessive particle size.

The above are further detailed descriptions of the present disclosure with reference to specific embodiments, and it should not be construed that the specific embodiments of the present disclosure are limited to these descriptions. For those of ordinary skill in the technical field to which the present disclosure belongs, several simple deductions or replacements can be made without departing from the spirit and scope of the present disclosure, and should be regarded as falling within the scope of protection determined by the appended claims submitted by the present disclosure.

What is claimed is:

1. A device suitable for forming spherical particle clusters from fine powder, comprising:

a preforming device, a spheroidizing device and a grading device, wherein the preforming device comprises a first screen, a cylindrical hopper connected to a position under the first screen, a rotating scraper arranged on the first screen, pressing the clusters to pass through the first screen and disposed on the center of the cylindrical hopper, a V-shaped vibration groove made of metal, a vibration unit driven by a vibration controller and a base adjustable in angle, wherein the pore size of the first screen is 300-600 μm and the scraper with adjustable directions and speeds is used for forcing fine powder clusters that do not pass through the screens to pass through the screens; the vibration groove is connected to the vibration unit and disposed under the first screen, and the preforming device prepares powder having a particle size in micron level into the clusters and the clusters passing through the first screen fall onto the V-shaped vibration groove through the hopper; by adjusting the angle of the base, an inclination angle of the V-shaped vibration groove is changed from 0 to 15°; and the V-shaped vibration groove 4 continuously beats the clusters, making the clusters move forward continuously;

wherein, the spheroidizing device comprises a rotating metal cylindrical container, wherein the bottom of the metal cylindrical container is provided with one or more baffles for promoting the flow of clusters within the cylindrical container; an inner wall of the metal cylindrical container is coated with one or more coatings comprising, but not limited to, one or a combination of more of Teflon, polyurethane, polyurethane resin, epoxy resin, hydroxypolyester resin, and epoxy/polyester resin; and the metal cylindrical container is fixed on a rotating shaft which is rotatable and has an adjustable rotation speed and angle; wherein a motor controls the rotating shaft to rotate and drives the rotating cylindrical container to rotate, and a spheroidizing controller controls a rotation speed and an elevation angle of the rotating shaft; and the grading device comprises one or more second screens for grading the clusters according to particle sizes, which are stacked with each other according to pore sizes, the larger the pore size of a screen, the higher the position where the screen is located, and a collection tray for collecting finest particles is located at the lowermost part; wherein the second screens and the collection tray are stacked with each other and fixed to a shaker, and the shaking amplitude and time are controlled by a shaking controller;

wherein the clusters are treated by the preforming device, the spheroidizing device and the grading device in a sequential order, and the clusters passing through the preforming device are more compact and have better flowability than the clusters before passing through the preforming device, and the clusters enter the spheroidizing device for spheroidizing to obtain a desired roundness and hardness; and the clusters enters the grading device for grading according to different particle sizes to obtain the clusters of different sizes.

2. The device suitable for forming spherical particle clusters from fine powder according to claim 1, wherein one or more vibration units having an adjustable vibration frequency and intensity are arranged under the vibration groove, and the vibration units are used for vibrating the vibration groove and making fluffy clusters passing through the screens to have a certain hardness and preliminarily shaped.

3. The device suitable for forming spherical particle clusters from fine powder according to claim 1, wherein an angle between the vibration groove and a horizontal plane is 0-30°.

4. The device suitable for forming spherical particle clusters from fine powder according to claim 3, wherein a lifting lever is disposed between the vibration groove and the horizontal plane.

* * * * *